G. P. MOLONEY.
Pipe Wrenches.

No. 139,177.
Patented May 20, 1873.

ATTEST:
H. Sprague
H. F. Eberts

INVENTOR:
Geo. P. Moloney
By Attorney
Thos. S. Sprague

UNITED STATES PATENT OFFICE.

GEORGE P. MOLONEY, OF DETROIT, MICHIGAN.

IMPROVEMENT IN PIPE-WRENCHES.

Specification forming part of Letters Patent No. 139,177, dated May 20, 1873; application filed March 8, 1873.

*To all whom it may concern:*

Be it known that I, GEORGE P. MOLONEY, of Detroit, in the county of Wayne and State of Michigan, have invented a new and useful Improvement in Pipe-Tongs; and I do declare that the following is a true and accurate description thereof, reference being had to the accompanying drawing and to the letters of reference marked thereon and being a part of this specification, in which—

Figure 1:
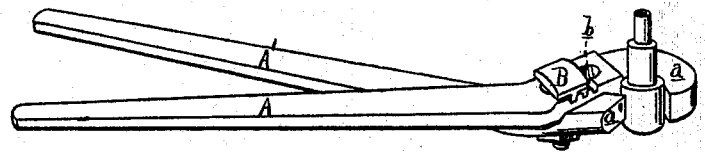
Figure 2:
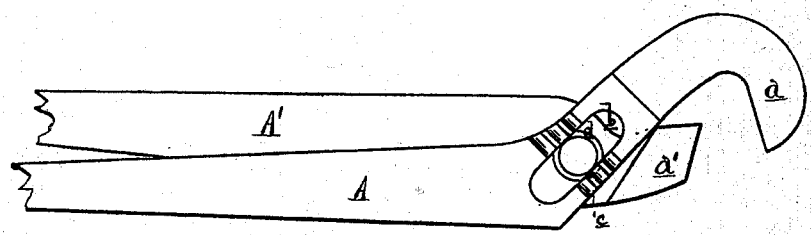
Figure 3:
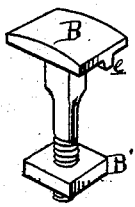

Figure 1 is a perspective view of my improved tongs. Fig. 2 is a plan of the same, the fulcrum-bolt being removed. Fig. 3 is a perspective view of the fulcrum-bolt.

Like letters refer to like parts in the several figures.

The nature of this invention relates to an improvement in pipe tongs of that class which are designed to grasp cylindrical objects of various diameters, and has for its object to so construct the tongs as to make it more readily adjustable than those now in use; and it consists in the peculiar construction of the device, as more fully hereinafter set forth.

In the drawing, A A' represent the levers of the tongs, the former of which has a hook, a, turned at the extremity of its shorter arm, while the short arm of the lever A' terminates in a bit, a', as in the ordinary tongs. The offset of the lever A is longitudinally slotted, as at b, and in the outer face of the slotted part three or more transverse recesses, c, are formed. The other lever has an eye for the fulcrum-bolt B, which passes through it; but around the bolt a bushing or sleeve, d, sits in the eye. The length of this sleeve is a little greater than the thickness of the lever A' at the eye, so that when the nut B' is screwed home on the bolt it will impinge on the sleeve and not on the lever to bind it and impede its action. The shank of the bolt where it passes through the slot is square, to prevent it from turning therein; and under the head is formed a rib, e, at one side of the center of the bolt, which rib rests in one of the recesses c. To adjust the tongs, slacken the nut sufficiently to allow the rib to free itself from the recess; then move the hook of the lever A outwardly, away from the bit of the lever A'. If it be desired to engage with a pipe of large diameter, or, vice versa, if to grasp a smaller one, drop the rib into the proper recess and tighten up the nut, when the tongs are ready for use. The recesses are adjusted such distances apart as to enable the tongs to grasp pipes of three standard sizes; but the rib being eccentric with the bolt, by turning it half around intermediate diameters may be grasped.

What I claim as my invention, and desire to secure by Letters Patent, is—

The combination of the bolt B, having rib e and sleeve d, with the levers A A', constructed as described, for the purpose set forth.

GEO. P. MOLONEY.

Witnesses:
H. F. EBERTS,
THEO. S. DAY.